US007461161B2

(12) United States Patent
Horiguchi

(10) Patent No.: US 7,461,161 B2
(45) Date of Patent: Dec. 2, 2008

(54) INFORMATION PROCESSING APPARATUS AND METHOD FOR DECODING ENCODED DATA

(75) Inventor: Masato Horiguchi, Tokyo (JP)

(73) Assignee: Sony Corporation, Tokyo (JP)

(*) Notice: Subject to any disclaimer, the term of this patent is extended or adjusted under 35 U.S.C. 154(b) by 678 days.

(21) Appl. No.: 10/153,031

(22) Filed: May 20, 2002

(65) Prior Publication Data

US 2003/0005141 A1    Jan. 2, 2003

(30) Foreign Application Priority Data

May 21, 2001   (JP) ............................... 2001-150890

(51) Int. Cl.
 *G06F 15/16* (2006.01)
 *H04L 12/28* (2006.01)
(52) U.S. Cl. ..................... 709/231; 709/230; 370/395.1
(58) Field of Classification Search ......... 709/230–231; 370/395.1; 341/143
See application file for complete search history.

(56) References Cited

U.S. PATENT DOCUMENTS 5,854,840 A * 12/1998 Cannella, Jr. ............... 380/268
6,216,152 B1 * 4/2001 Wong et al. ................. 709/203
6,247,048 B1 * 6/2001 Greer et al. ................. 709/219
6,557,031 B1 * 4/2003 Mimura et al. .............. 709/218
6,631,403 B1 * 10/2003 Deutsch et al. ............. 709/217
2001/0034784 A1 * 10/2001 Holler et al. ................ 709/223
2002/0065935 A1 * 5/2002 Koperda et al. ............. 709/238

FOREIGN PATENT DOCUMENTS

JP    10 232841    9/1998
JP    10 285240    10/1998

* cited by examiner

*Primary Examiner*—William C. Vaughn, Jr.
*Assistant Examiner*—Peling A Shaw
(74) *Attorney, Agent, or Firm*—Frommer Lawrence & Haug LLP; William S. Frommer; Paul A. Levy

(57) ABSTRACT

This invention relates to an information-processing apparatus for transmitting streaming data through a network, including: an addition element for adding information used for carrying out processing on streaming data to the streaming data; a storage element for storing the streaming data and the information added to the streaming data by the addition element; and a transmission element for transmitting the streaming data which is stored by the storage element and which includes the information.

22 Claims, 8 Drawing Sheets

INFORMATION PROCESSING APPARATUS AND METHOD FOR DECODING ENCODED DATA

BACKGROUND OF THE INVENTION

In general, the present invention relates to an information-processing apparatus, an information-processing method, a network system, and a program. More specifically, the present invention relates to an information-processing apparatus, an information-processing method, a network system, and a program, which can exchange streaming data without regard to the type of the compression and decompression technique of the streaming data by addition of a program to be executed for carrying out processing on the streaming data to the streaming data and transmission of the program along with the streaming data.

There are many servers for distributing streaming data such as audio data and moving-picture data, which can be displayed in a real-time manner while the data is being received through the Internet. Picture or audio information is input through a video camera and a microphone and converted into data by a video-capture card and/or a sound card before being compressed by using an encoder. The compressed data is kept by a distribution server as a file of streaming data to be transmitted to a client as requested by the client on an on-demand basis. In addition to such an on-demand system, there is also provided a system in which compressed data is distributed to a plurality of clients at the same time.

In either system, while receiving distributed streaming data, a client uses a decoder conforming to the technique of compressing the received streaming data to decompress the data before outputting the data to a display unit and/or a speaker.

However, there are a number of data compression and decompression techniques such as an MPEG (Moving Picture (coding) Expert Group) 2 or 4, MP3 (MPEG Audio Layer-3) and ATRAC (Adaptive Transform Acoustic Coding™). For this reason, the system described above has a problem that the client must have many decoders if the client receives various kinds of streaming data compressed by using a variety of compression techniques.

In addition, there is also raised a problem that the distribution server must adopt several different compression techniques for different kinds of streaming data in order to keep up with demands raised by a number of clients.

Moreover, a client can be a portable terminal such as a PDA (Personal Digital Assistant). In this case, since a space for a storage device and the storage capacity thereof are small in the portable terminal, it is difficult for the client to have a plurality of decoders. Thus, there is raised a problem that the portable terminal can be used only for handling streaming data compressed by adoption of a certain compression and decompression technique.

SUMMARY OF THE INVENTION

It is thus an object of the present invention addressing the problems described above to provide a capability of exchanging streaming data without regard to the type of the compression and decompression technique of the streaming data by addition of a program to be executed for carrying out processing on the streaming data to the streaming data and by transmission of the program along the streaming data.

According to a first aspect of the present invention, there is provided an information-processing apparatus for transmitting streaming data through a network, including: an addition element for adding information used for carrying out processing on streaming data to the streaming data; a storage element for storing the streaming data and the information added to the streaming data by the addition element; and a transmission element for transmitting the streaming data which is stored by the storage element and which includes the information.

According to a second aspect of the present invention, there is provided an information-processing method adopted by an information-processing apparatus for transmitting streaming data through a network, including: an addition step of adding information used for carrying out processing on streaming data to the streaming data; a storage step of storing the streaming data and the information added to the streaming data in the addition step; and a transmission step of transmitting the streaming data which is stored in the storage step and which includes the information.

According to a third aspect of the present invention, there is provided a program to be executed by a computer for controlling an information-processing apparatus for transmitting streaming data through a network, the program including: an addition step of adding information used for carrying out processing on streaming data to the streaming data; a storage step of storing the streaming data and the information added to the streaming data in the addition step; and a transmission step of transmitting the streaming data which is stored in the storage step and which includes the information.

According to a fourth aspect of the present invention, there is provided an information-processing apparatus for receiving streaming data through a network, including: a reception element for receiving streaming data to which information used in carrying out processing on the streaming data is added; a processing element for carrying out processing on the streaming data received by the reception element in accordance with the information added to the streaming data; and an output element for outputting a result of the processing carried out on the streaming data by the processing element.

According to a fifth aspect of the present invention, there is provided an information-processing method adopted by an information-processing apparatus for receiving streaming data through a network, including: a reception step of receiving streaming data to which information used in carrying out processing on the streaming data is added; a processing step of carrying out processing on the streaming data received in the reception step in accordance with the information added to the streaming data; and an output step of outputting a result of the processing carried out on the streaming data in the processing step.

According to a sixth aspect of the present invention, there is provided a program to be executed by a computer for controlling an information-processing apparatus for receiving streaming data through a network, the program including: a reception step of receiving streaming data to which information used in carrying out processing on the streaming data is added; a processing step of carrying out processing on the streaming data received in the reception step in accordance with the information added to the streaming data; and an output step of outputting a result of the processing carried out on the streaming data in the processing step.

According to a seventh aspect of the present invention, there is provided a network system including a first information-processing apparatus connected to a network and used for transmitting streaming data and a second information-processing apparatus connected to the network and used for receiving the streaming data, wherein the first information-processing apparatus includes: an addition element for adding information used for carrying out processing on streaming data to the streaming data; a storage element for storing the streaming data and the information added to the streaming data by the addition element; and a transmission element for transmitting the streaming data, which is stored by the storage element and includes the information, and wherein the second information-processing apparatus includes: a reception element for receiving streaming data to which information used in carrying out processing on the streaming data is added; a processing element for carrying out processing on the streaming data received by the reception element in accordance with the information added to the streaming data; and an output element for outputting a result of the processing carried out on the streaming data by the processing element.

BRIEF DESCRIPTION OF THE DRAWINGS

The above and other objects, features and advantages of the present invention will be apparent from the following detailed description of the preferred embodiment of the invention in conjunction with the accompanying drawings, in which.

DETAILED DESCRIPTION OF THE PREFERRED EMBODIMENT

Figure 1:
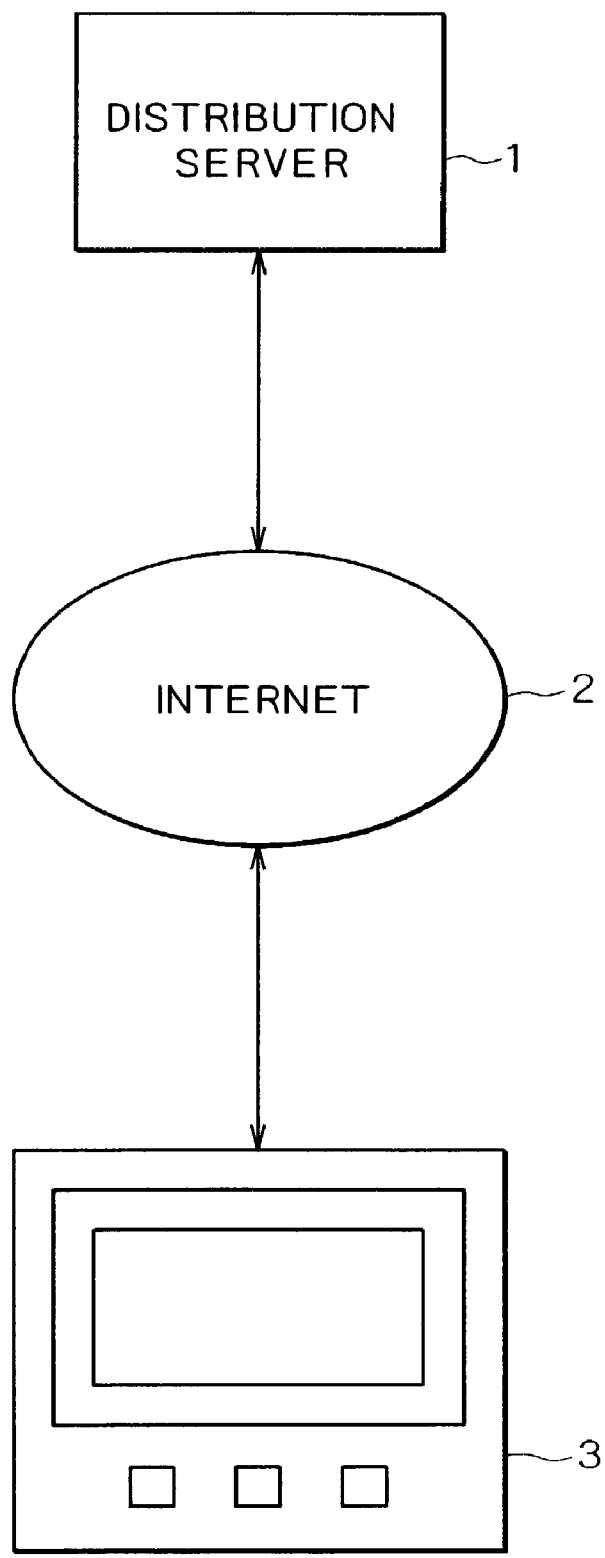
FIG. 1 is a diagram showing a typical configuration of a network system to which the present invention is applied.

FIG. 1 is a diagram showing a typical configuration of a network system to which the present invention is applied.

A distribution server 1 for distributing streaming data is connected to the Internet 2 A PDA (Personal Digital Assistant) 3 receiving streaming data distributed by way of the Internet 2 is also connected to the Internet 2. While the figure shows only one distribution server 1 and one PDA 3, in actuality, a plurality of such servers and a plurality of PDAs may be connected to the Internet 2.

Figure 2:
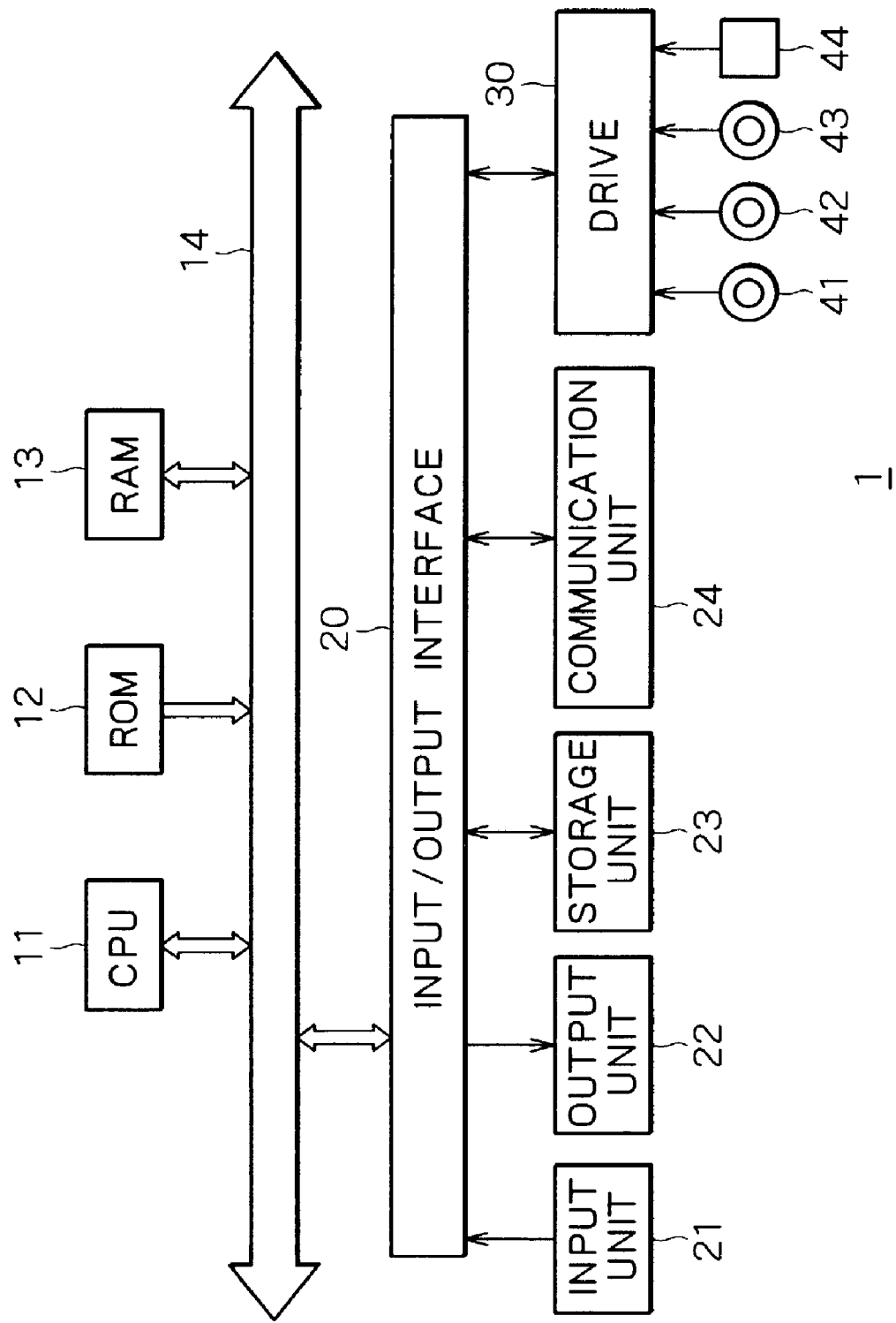
FIG. 2 is a block diagram showing the configuration of a distribution server shown in FIG. 1.

FIG. 2 is a block diagram showing the configuration of the distribution server 1.

A CPU (Central Processing Unit) 11 shown in FIG. 2 carries out various kinds of processing by execution of programs stored in advance in a ROM (Read-Only Memory) 12 or programs loaded from a storage unit 23 into a RAM (Random-Access Memory) 13. The RAM 13 is also appropriately used for storing, among others, data required in carrying out the various kinds of processing. The CPU 11, the ROM 12 and the RAM 13 are connected to each other by a bus 14. An input/output interface 20 is also connected to the bus 14.

The input/output interface 20 is connected to an input unit 21, an output unit 22, the storage unit 23 and a communication unit 24. The input unit 21 includes a keyboard and a mouse. The output unit 22 includes a display unit such as a CRT (Cathode Ray Tube) or an LCD (Liquid-Crystal Display) and a speaker. The storage unit 23 includes a hard disc or the like. The communication unit 24 includes a modem and a terminal adapter.

The storage unit 23 is used for storing streaming data for distribution. The streaming data for distribution includes MPEG4 data (Moving Picture (coding) Expert Group 4 data) obtained as a result of compression of moving-picture data and decoder data, which is a program functioning as a decoder for decompressing (decoding) the MPEG4 data.

The communication unit 24 carries out processing of communication through the Internet 2. The communication unit 24 distributes the streaming data stored in the storage unit 23 for distribution by using an RTP (Real-Time Transport Protocol)/RTSP (Real-Time Streaming Protocol) protocol.

If necessary, the input/output interface 20 is also connected to a driver 30. On the driver 30, there is mounted a magnetic disc 41, an optical disc 42, a magneto-optical disc 43 or a semiconductor memory 44. A computer program read out from the magnetic disc 41, the optical disc 42, the magneto-optical disc 43 or the semiconductor memory 44 is installed in the storage unit 23.

Figure 3:
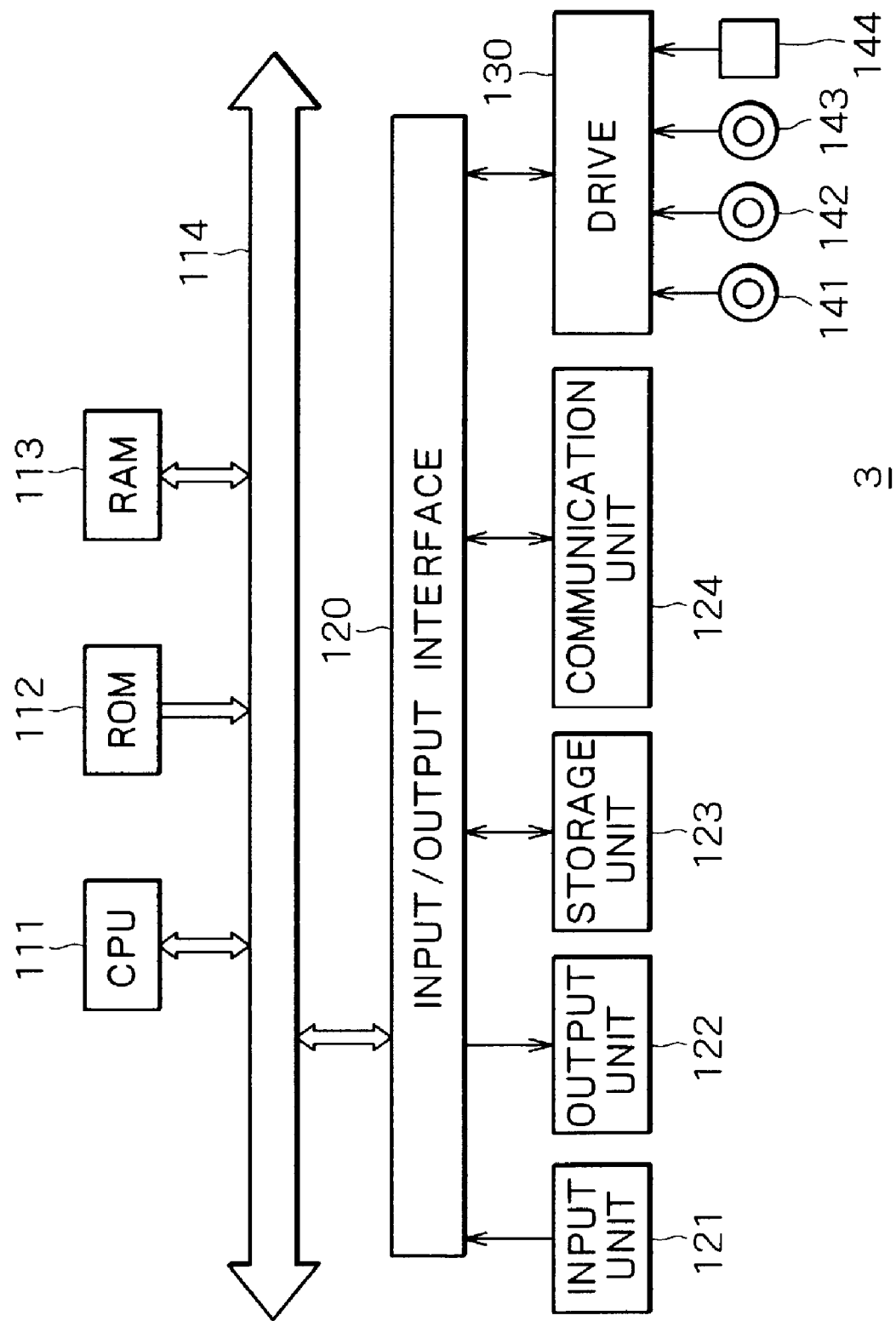
FIG. 3 is a block diagram showing the configuration of a PDA shown in FIG. 1.

FIG. 3 is a block diagram showing the configuration of the PDA 3. As shown in the figure, the PDA 3 includes components ranging from a CPU 111 to a semiconductor memory 144, which correspond to respectively the CPU 11 to the semiconductor memory 44 in the distribution server 1. Since the basic configuration of the PDA 3 is the same as the distribution server 1, its explanation is not repeated.

Figure 4:
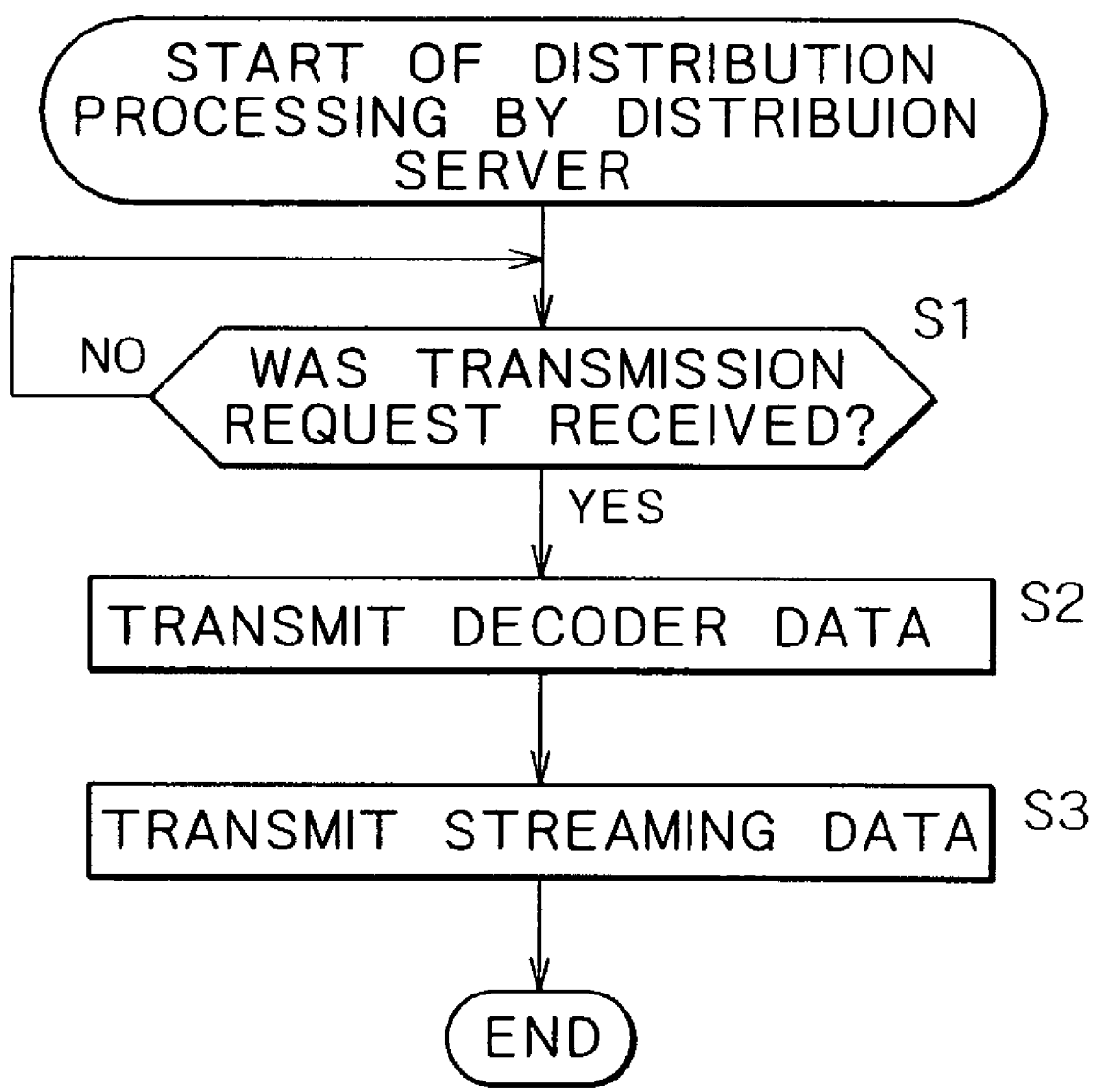
FIG. 4 is a flowchart representing distribution processing carried out by the distribution server to transmit streaming data to the PDA shown in FIG. 1.

At a request made by the PDA 3, the distribution server 1 transmits streaming data to the PDA 3. FIG. 4 is a flowchart representing distribution processing carried out by the distribution server 1 to transmit streaming data to the PDA 3. This distribution processing is explained by referring to a flowchart shown in FIG. 4 as follows.

As shown in the figure, the flowchart begins with a step S1 at which the CPU 11 employed in the distribution server 1 controls the communication unit 24, forming a judgment as to whether or not a request for transmission of streaming data has been received from the PDA 3. If the outcome of the judgment indicates that such a request has not been received, the judgment is formed repeatedly till the outcome of the judgment indicates that a request has been received. If the CPU 11 determines that a request for transmission of streaming data has been received from the PDA 3, the flow of the distribution processing goes on to a step S2.

At the step S2, the CPU 11 transmits decoder data of the streaming data specified in the transmission request received from the PDA 3 to the PDA 3.

Figure 5:
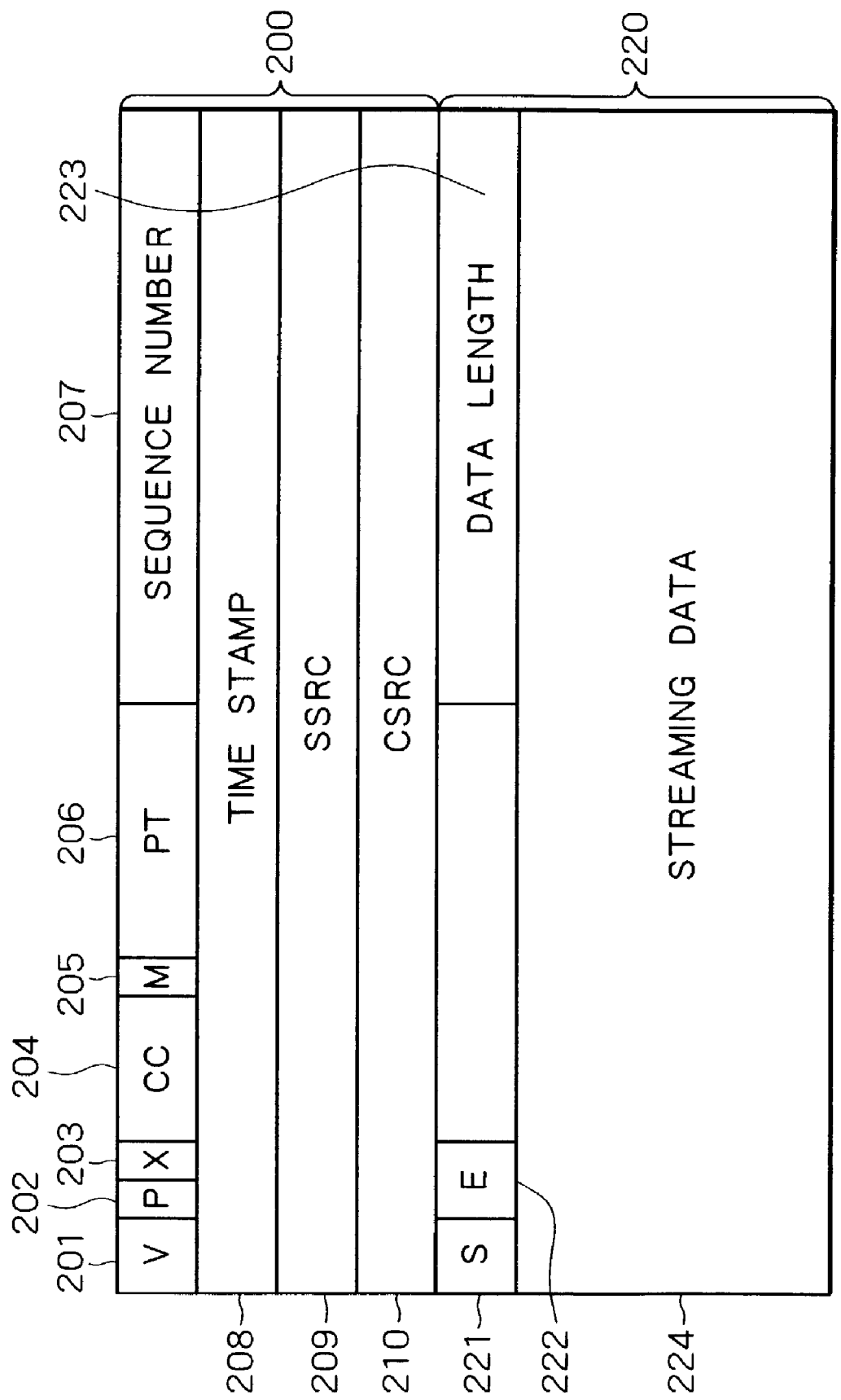
FIG. 5 is a diagram showing a typical configuration of an RTP packet.

FIG. 5 is a diagram showing a typical configuration of an RTP packet containing decoder data or streaming data to be transmitted.

As shown in the figure, an RTP packet includes a fixed-length header 200 and a data portion 220 containing streaming data to be transmitted.

The header 200 of an RTP packet includes version bits 201, a padding bit 202, an extension bit 203, a CSRC (contributing source) 210 which indicates IDs (identifiers) of sender parties, a CSRC count 204, a marker 205, a payload type 206, a sequence number 207, a time stamp 208, and a SSRC (synchronization source) 209. The version bits 201 show a version of the RTP. The padding bit 202 set at 1 indicates that at least a padding octet is inserted into the end of the packet. The extension bit 203 indicates the existence of an extension. The CSRC count 204 is the number of IDs of the sender parties cataloged in the CSRC 210. The payload type 206 is the type of data to be transmitted. The sequence number 207 is used for detecting a lost packet for a case in which data is recovered in accordance with an order. The time stamp 208 is used for recording a time. The SSRC 209 is the ID of a sender.

On the other hand, the data portion 220 includes a start packet bit 221, an end packet bit 222, a data length 223 and streaming data 224. When set, the start packet bit 221 indicates that this packet is the first packet of data to be transmitted. By the same token, when set, the end packet bit 222 indicates that this packet is the last packet of data to be transmitted. The data length 223 indicates the length of data contained in this packet. The streaming data 224 is data to be transmitted.

The CPU 11 employed in the distribution server 1 transmits decoder data to the PDA 3 as described above in the form of packets shown in FIG. 5. In this case, the CPU 11 sets PLUG_IN in the payload type 206 and fills the streaming data 224 with the decoder data. As the transmission of the decoder data is completed, the flow of the distribution processing goes on to a step S3.

At the step S3, the CPU 11 transmits MPEG4 data also in the form of packets shown in FIG. 5 to the PDA 3. The MPEG4 data is obtained as a result of compression of the streaming data desired by the PDA 3 in the request for transmission. In this case, the CPU 11 sets MPEG4 in the payload type 206 and fills the streaming data 224 with the streaming data. As the transmission of the streaming data is completed, the distribution processing is ended.

The transmitted RTP packets are received by the PDA 3, which made the request for transmission of data.

Figure 6:
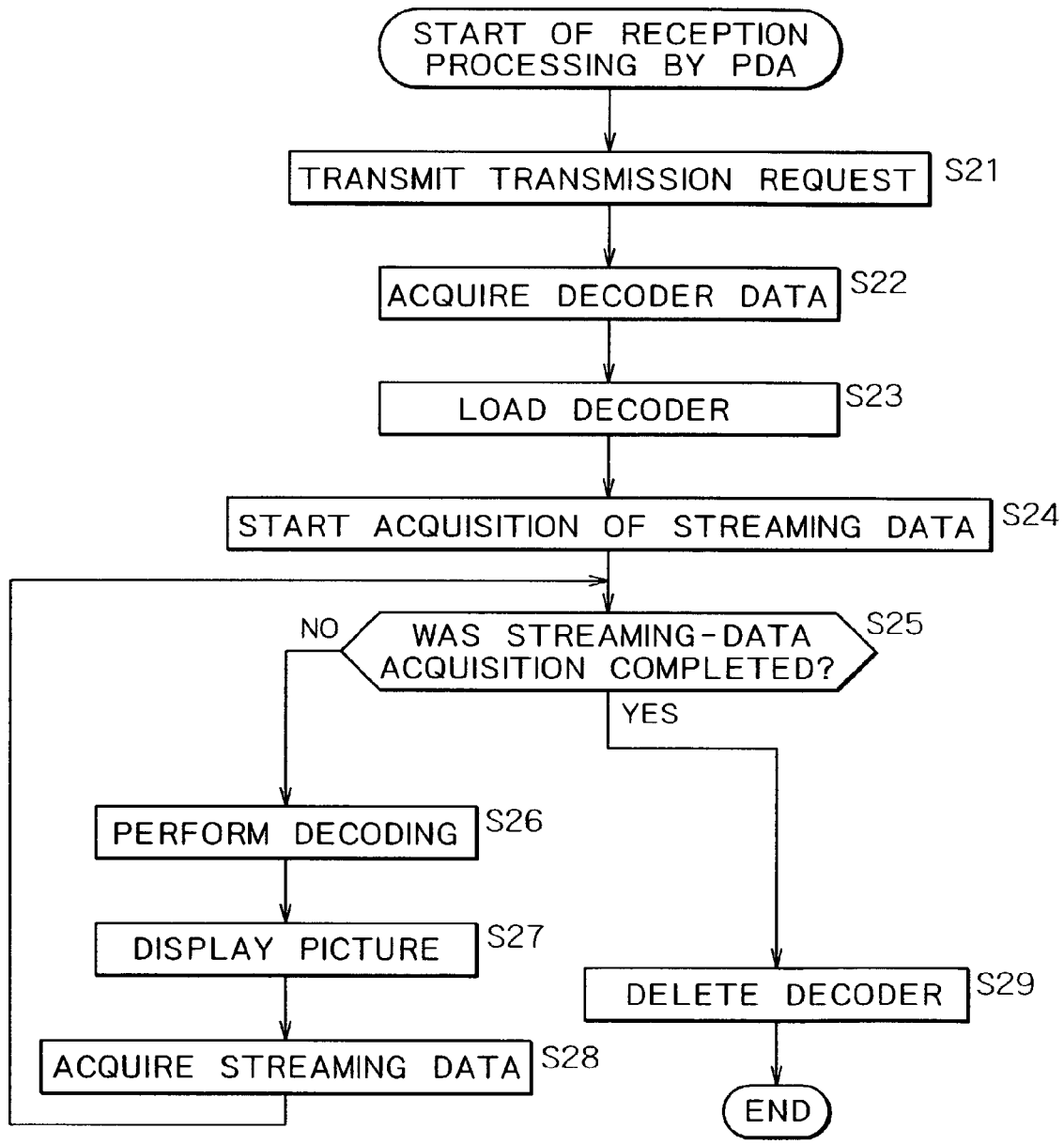
FIG. 6 is a flowchart representing streaming-data reception processing carried out by the PDA shown in FIG. 1.

FIG. 6 is a flowchart representing reception processing carried out by the PDA 3 to receive streaming data from the distribution server 1. This reception processing is explained by referring to the flowchart shown in FIG. 6 as follows.

As shown in the figure, the flowchart begins with a step S21 at which the CPU 111 employed in the PDA 3 controls the communication unit 124 to transmit a request for transmission of streaming data to the distribution server 1 by way of the Internet 2.

Then, at the next step S22, the CPU 111 controls the communication unit 124 to receive the RTP packet from the distribution server 1. The CPU 111 then refers to the payload type 206 of the header 200 of the received RTP packet. The payload type 206 is found out to be PLUG$_{13}$ IN, indicating that the RTP packet contains decoder data. Thus, the CPU 111 acquires the decoder data from the RTP packet.

Figure 7:
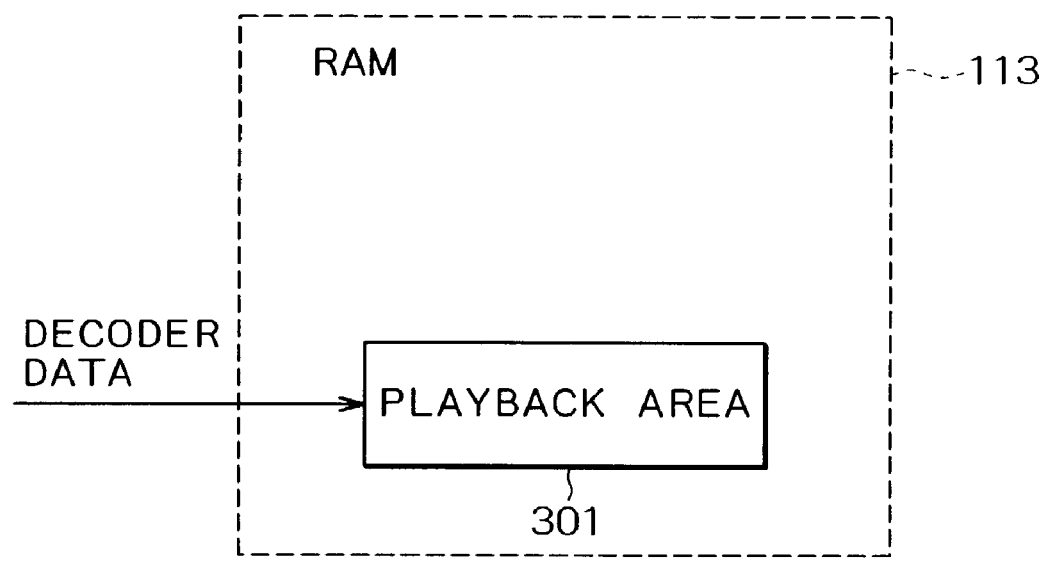
FIG. 7 is an explanatory diagram used for describing processing carried out by a CPU shown in FIG. 3 on decoder data using a RAM to acquire a decoder.

FIG. 7 is an explanatory diagram used for describing processing of the decoder data using the RAM 113. The CPU 111 stores the acquired decoder data in a playback area 301 of the RAM 113. The decoder data is accumulated and assembled in the playback area 301. The CPU 111 carries out the processing to acquire data, beginning with a first packet having a set start packet bit 221 and ending with a last packet having a set end packet bit 222.

Figure 8:
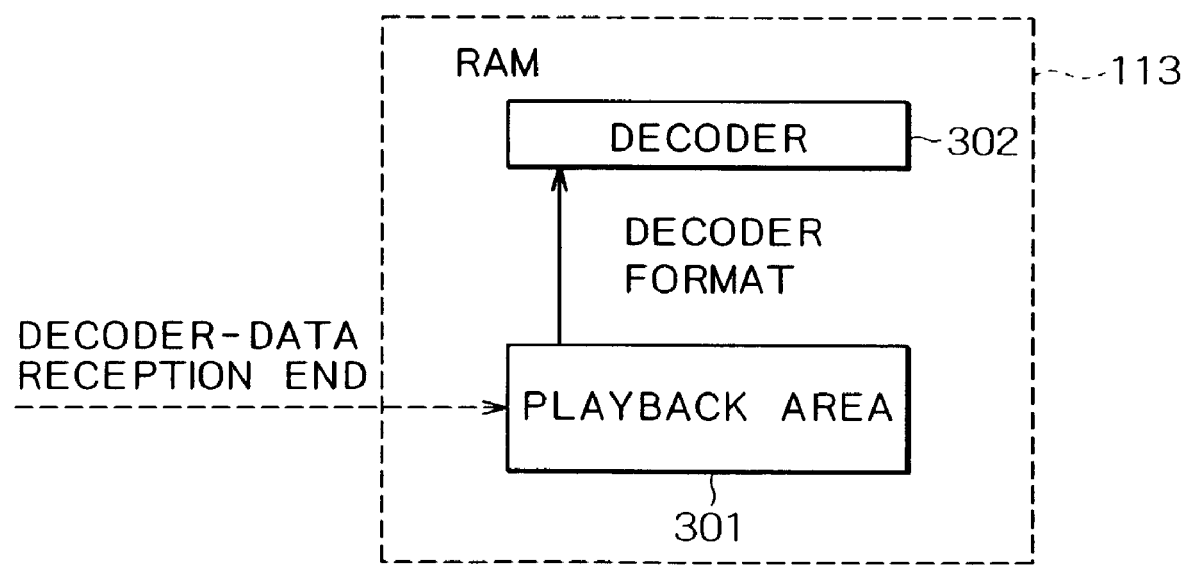
FIG. 8 is an explanatory diagram used for describing processing carried out by the CPU shown in FIG. 3 on decoder data using the RAM to create a decoder.

As the CPU 111 acquires the last packet, the flow of the reception processing goes on to a step S23 at which a decoder 302 is created in the RAM 113. FIG. 8 is an explanatory diagram used for describing processing of data using the RAM 113. The CPU 111 forms the decoder 302 assembled in the playback area 301 in another area of the RAM 113.

When the CPU 111 completes the creation of the decoder 302, the flow of the reception processing goes on to a step S24 at which the CPU 111 controls the communication unit 124 to start processing to receive other RTP packets containing MPEG4 data from the distribution server 1. The CPU 111 then refers to the payload type 206 of the header 200 of a received RTP packet. The payload type 206 is found out to be MPEG4, indicating that the RTP packet contains streaming data. Thus, the CPU 111 acquires the streaming data from the RTP packet.

After the CPU 111 starts the acquisition of MPEG4 data, the flow of the reception processing goes on to a step S25 to form a judgment as to whether or not the acquisition of the MPEG4 data, that is, the streaming data, has been completed. If the outcome of the judgment indicates that the acquisition of the MPEG4 data has not been completed as evidenced by the fact that a last packet having a set end packet bit 222 has not been received, the reception processing goes on to a step S26 at which the CPU 111 decompresses the acquired MPEG4 data by using the decoder 302, converting the data into picture data. As the processing to convert the MPEG4 data into picture data is completed, the flow of the reception processing goes on to a step S27 at which the picture data obtained as a result of the conversion processing is supplied to the output unit 122 to be displayed on the display unit.

Then, at the next step S28, the CPU 111 receives a new packet and acquires MPEG4 data from the new packet. After the CPU 111 acquires the MPEG data, the flow of the reception processing goes back to the step S25 to repeat processing of the step and the subsequent steps.

Figure 9:
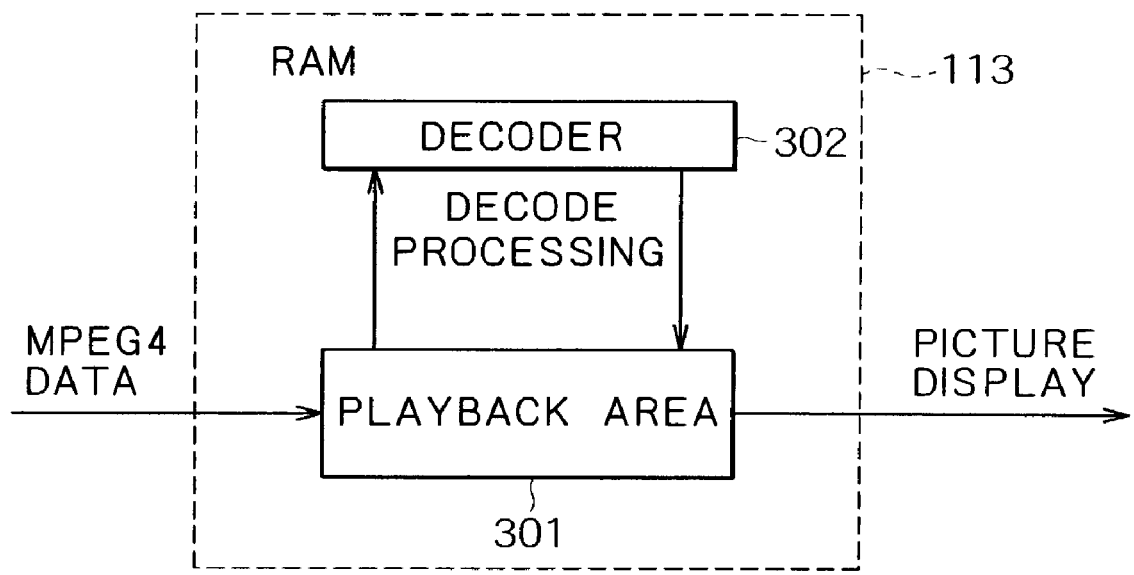
FIG. 9 is an explanatory diagram used for describing processing carried out by the CPU shown in FIG. 3 on decoder data using the RAM to decompress MPEG4 data by using a decoder.

FIG. 9 is an explanatory diagram used for describing processing of the MPEG4 data using the RAM 113. The CPU 111 supplies the acquired MPEG4 data to the playback area 301 of the RAM 113 through the decoder 302, which decompresses the MPEG4 data. Then, the CPU 111 supplies picture data obtained as a result of decompression of the MPEG4 data to the output unit 122 by way of the playback area 301 to be displayed on the display unit.

As the outcome of the judgment formed at the step S25 indicates that the acquisition of the MPEG4 data is completed as evidenced by the fact that a last packet having a set end packet bit 222 has been received, the reception processing goes on to a step S29 at which the CPU 111 deletes the decoder 302 created in the RAM 113 from the RAM 113. As the deletion is completed, the CPU 111 ends the reception processing.

By carrying out the processing described above, streaming data can be exchanged by any apparatus without regard to the type of the compression and decompression technique.

In addition, by execution of a decoder program written in Java®, streaming data can be created without regard to the type of the CPU on the reception side. Thus, the distribution server 1 can further reduce the amount of streaming data stored in the storage unit 23.

Figure 10:
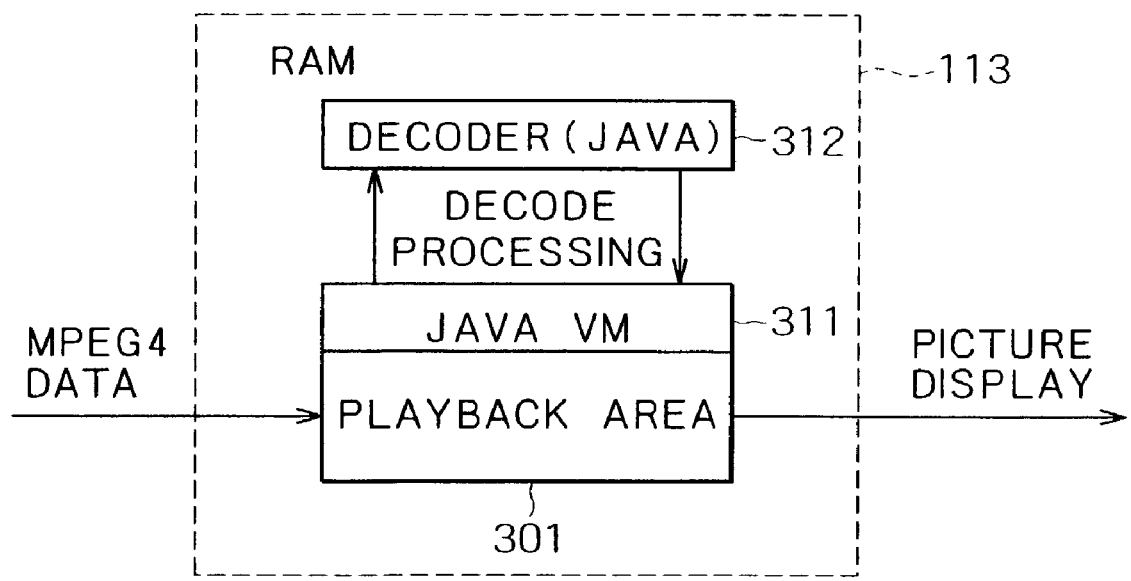
FIG. 10 is an explanatory diagram used for describing processing to decode MPEG4 data by execution of a decoder program written in Java®.

In this case, a VM (Virtual Machine) 311 for Java® is required in order to execute the decoder. FIG. 10 is an explanatory diagram used for describing processing to decode MPEG4 data by execution of a decoder program written in Java®. As shown in FIG. 10, the decoder 312 created in the RAM 113 exchanges data with the playback area 301 through the VM 311 for Java® in order to carry out processing to decode MPEG4 data.

In the embodiment described above, streaming data once kept in the distribution server 1 is transmitted to a client at a request made by the client on an on-demand basis. However, the scope of the present invention is not limited to this embodiment. For example, streaming data can also be transmitted to a client in a real-time manner or distributed to a plurality of clients at the same time.

In addition, while the storage unit 23 employed in the distribution server 1 as shown in FIG. 2 is used for storing streaming data consisting of MPEG4 data obtained as a result of compression of picture data and decoder data used as a decoder for decompressing the MPEG4 data, the scope of the present invention is not limited to this scheme. For example, the MPEG4 data and the decoder can be kept in separate files and, when the MPEG4 data and the decoder are transmitted, they are combined.

In the above description, PLUG_IN or MPEG4 is set in the payload type 206 shown in FIG. 5. In actuality, however, predetermined numbers are set in place of PLUG_IN or MPEG4. That is to say, PLUG_IN or MPEG4 do not have to be set in the payload type 206 for decoder data or MPEG4 data respectively.

In the embodiment described above, distributed data is MPEG4 moving-picture data. However, the distributed data is not limited to MPEG4 moving-picture data. For example, distributed data can also be MPEG2 moving-picture data, MP3 (MPEG Audio Layer-3) musical data or ATRAC (Adaptive Transform Acoustic Coding™) musical data.

In addition, while distributed streaming data is explained in this specification as data consisting of MPEG4 data obtained as a result of compression of picture data and decoder data used as a decoder for decompressing the MPEG4 data, the scope of the present invention is not limited to this scheme. For example, the streaming data may also include encrypted MPEG4 data and a descrambler for descrambling the encrypted MPEG4 data.

Furthermore, the distribution server 1 may also include a program in the streaming data. The program is to be executed to carry out degradation processing on the streaming data on the basis of copy information specified at a copy time of the streaming data.

Moreover, when a relay station or the like is used in the distribution of streaming data, the relay station transforms the streaming data into a bit rate proper for the network, through which the streaming data is to be distributed. In this case, in order to make the streaming data distributable, the distribution server may include an encoder for carrying out an encoding process proper for the streaming data or a transcoder for carrying out transcoding in the distributed streaming data.

In addition, when a relay station or the like is used in the distribution of streaming data, in order to make the relay station capable of encrypting and distributing the streaming data, the distribution server may include a scrambler for scrambling or a descrambler for descrambling in the distributed streaming data.

Furthermore, the client to which the present invention is applied is not limited to a PDA, but can also be a mobile phone, a game terminal or a personal computer.

If the sequential processing is implemented by software, programs composing the software are installed from a network or a recording medium in a computer including embedded dedicated hardware or another computer such as a general-purpose personal computer capable of carrying out a variety of functions by execution of a variety of programs installed in the personal computer.

As show in FIGS. 2 and 3, the recording medium for recording programs to be installed in the computer including embedded dedicated hardware or the general-purpose personal computer can be a package medium such as the magnetic disc 41 or 141 including a floppy disc, the optical disc 42 or 142 including a CD-ROM (Compact-Disc Read-Only Memory) and a DVD (Digital Versatile Disc), the magneto-optical disc 43 or 143 including an MD (MiniDisc) or the semiconductor memory 44 or 144. Provided separately from the main unit of the distribution server 1 or the PDA 3, the package medium is distributed to users to present the programs recorded therein to the users.

Instead of installing the programs in the computer including embedded dedicated hardware or the general-purpose personal computer from a package medium or a network, the programs can also be stored in advance the ROM 12 or 112 embedded along with the CPU 11 or the CPU 111 in the distribution server 1 or the PDA 3 respectively.

It should be noted that, in this specification, steps composing a program recorded in a recording medium include mainly pieces of processing to be executed sequentially in accordance with a predetermined order along the time axis. However, the steps are not necessarily the pieces of processing to be executed sequentially. Instead, the steps may include pieces of processing to be executed concurrently or individually.

In addition, the technical term 'network system' used in this specification means the entire system including a plurality of apparatus.

In accordance with the present invention, a first information-processing apparatus, first information-processing method, and first program, streaming data is stored along with information (decoder) added to the streaming data to be used in processing carried out on the streaming data, and the streaming data including the information is transmitted. As a result, the distributed streaming data can be regarded as data of one type.

In accordance with the present invention, a second information-processing apparatus, second information-processing method, and second program, streaming data is received along with information (decoder) added to the streaming data to be used in processing carried out on the streaming data, the streaming data is processed in accordance with the information and a result of the processing carried out on the streaming data is output. As a result, it is not necessary to provide a decoder in advance.

In the network system provided by the present invention, the first information-processing apparatus transmits streaming data including information (decoder) added to the streaming data to be used in processing carried out on the streaming data, and the second information-processing apparatus receives the streaming data along with information (decoder), carrying out processing on the streaming data in accordance with the information before outputting a result of the processing carried out on the streaming data. As a result, streaming data can be exchanged without regard to the type of the technique for compressing and decompressing the streaming data.

What is claimed is:

1. An information-processing apparatus for transmitting streaming data through a network, comprising:
    a receiving means for receiving a request for streaming data;
    an encoding means for encoding the requested streaming data into an encoded format;
    a transmission means for transmitting said streaming data in the encoded format and executable processing information that can be assembled at a receiver into a decoder for the encoded format streaming data; and
    a control means for controlling said transmission means to transmit said executable processing information and then to transmit the streaming data in the encoded format after the receiver completes assembling the processing information into the decoder for the encoded format streaming data, wherein both the executable processing information and the encoded format streaming data are transmitted in response to receiving a request for only the streaming data, wherein the executable processing information and the assembled decoder are automatically deleted from the receiver after completion of decoding the encoded streaming data.

2. An information-processing method adopted by an information-processing apparatus for transmitting streaming data through a network, comprising:

a receiving step of receiving a request for the streaming data;

an encoding step for encoding the requested streaming data into an encoded format;

a transmission step of transmitting said streaming data in an encoded format and executable processing information that can be assembled at a receiver into a decoder for the encoded format streaming data; and a control step for controlling the transmission step to transmit the executable processing information and then to transmit the streaming data in the encoded format after the receiver completes assembling the executable processing information into the decoder for the encoded format streaming data, wherein both the executable processing information and the encoded format streaming data are transmitted in response to receiving a request for only the streaming data, wherein the executable processing information and the assembled decoder are automatically deleted from the receiver after completion of decoding the encoded streaming data.

3. A computer-readable recording medium having recorded thereon a program executable by a processor for performing a method to control an information-processing apparatus for transmitting streaming data through a network, said method comprising:

a receiving step of receiving a request for the streaming data;

an encoding step for encoding the requested streaming data into an encoded format;

a transmission step of transmitting said streaming data in an encoded format and executable processing information that can be assembled at a receiver into a decoder for the encoded format streaming data; and a control step for controlling the transmission step to transmit the executable processing information and then to transmit the streaming data in the encoded format after the receiver completes assembling the executable processing information into the decoder for the encoded format streaming data, wherein both the executable processing information and the encoded format streaming data are transmitted in response to receiving a request for only the streaming data, wherein the executable processing information and the assembled decoder are automatically deleted from the receiver after completion of decoding the encoded streaming data.

4. An information-processing apparatus for receiving streaming data through a network, comprising:

a reception means for receiving streaming data in an encoded format and executable processing information;

an assemble means for assembling said executable processing information into a decoder for the encoded format streaming data;

a controlling means for controlling said assemble means to assemble said executable processing information and for controlling the reception means to receive the encoded format streaming data after the assemble means completes assembling the executable processing information into the decoder for the encoded format streaming data;

a processing means to decode the encoded streaming data with the assembled decoder; and an output means for outputting a result of said decoding carried out on said encoded streaming data by said processing means, wherein both the executable processing information and the encoded format streaming data are received in response to a sending a request for only the streaming data, wherein the executable processing information and the assembled decoder are automatically deleted from the receiver after completion of decoding the encoded streaming data.

5. An information-processing method adopted by an information-processing apparatus for receiving streaming data through a network, comprising:

a reception step of receiving executable processing information;

an assemble step of assembling said executable processing information into a decoder for streaming data in an encoded format;

a processing step of receiving the encoded format streaming data after completing assembly of the executable processing information into the decoder and of decoding the encoded streaming data with the assembled decoder;

an output step of outputting a result of said decoding carried out on said encoded streaming data in said processing step; and automatically deleting the executable processing information and the assembled decoder from the memory after completion of processing of the encoded format streaming data, wherein both the executable processing information and the encoded format streaming data are received in response to a sending a request for only the streaming data.

6. The information-processing method of claim 5, wherein said executable processing information includes a transcoder for transcoding said encoded format streaming data.

7. The information-processing method of claim 5, wherein said executable processing information includes a descrambler for descrambling said encoded format streaming data.

8. A computer-readable recording medium having recorded thereon a program executable by a processor for performing a method to control an information-processing apparatus for receiving streaming data through a network, said method comprising:

a reception step of receiving executable processing information;

an assemble step of assembling said executable processing information into a decoder for streaming data in an encoded format;

a processing step of receiving the encoded format streaming data after completing assembly of the executable processing information into the decoder and of decoding the encoded streaming data with the assembled decoder;

an output step of outputting a result of said decoding carried out on said encoded streaming data in said processing step; and automatically deleting the executable processing information and the assembled decoder from the memory after completion of processing of the encoded format streaming data, wherein both the executable processing information and the encoded format streaming data are received in response to a sending a request for only the streaming data.

9. A network system comprising a first information-processing apparatus connected to a network and used for transmitting encoded format streaming data and a second information-processing apparatus connected to said network and used for receiving said encoded format streaming data, wherein said first information-processing apparatus includes:

a receiving means for receiving a request for streaming data from the second information-processing apparatus;

an encoding means for encoding the requested streaming data into the encoded format;

a transmission means for transmitting said encoded format streaming data and executable processing information that can be assembled at the second information-processing apparatus into a decoder for the encoded format streaming data; and a first control means for controlling said transmission means to transmit said executable processing information and then to transmit the encoded format streaming data after the second information-processing apparatus completes assembling the executable processing information into the decoder for the encoded format streaming data, wherein said second information-processing apparatus includes:

a reception means for receiving the encoded format streaming data and executable processing information from the first information-processing means;

an assemble means for assembling said executable processing information into a decoder for the encoded format streaming data;

a second control means for controlling said assemble means to assemble said executable processing information and for controlling the reception means to receive the encoded format streaming data after the assemble means completes assembling the executable processing information into the decoder for the encoded streaming data;

a processing means to decode the encoded format streaming data with the assembled decoder; and an output means for outputting a result of said decoding carried out on said encoded format streaming data by said processing means, wherein both the executable processing information and the encoded format streaming data are transmitted by the first information-processing apparatus in response to receiving a request for only the streaming data sent by the second information-processing apparatus, wherein the executable processing information and the assembled decoder are automatically deleted from the second information-processing apparatus after completion of decoding the encoded streaming data.

10. A method for transmitting data through a network, comprising:

encoding the data into an encoded format;

transmitting executable processing information through the network, the executable processing information can be assembled into a decoder to decode the encoded format data into recovered data at an external apparatus; and subsequently transmitting the encoded format data through the network after the external apparatus completes assembling the executable processing information into the decoder for decoding the encoded format, wherein both the executable processing information and the encoded format data are transmitted in response to receiving a request for only the data, wherein the executable processing information and the assembled decoder are automatically deleted from the external apparatus after completion of decoding the encoded streaming data.

11. An information-processing apparatus for transmitting data through a network, comprising:

a receiver to receive a request for the data from an external apparatus;

a processor to encode the data into an encoded format; and a transmitter to transmit both the encoded format data and executable processing information as streaming data over the network, the executable processing information can be assembled into a decoder to decode the encoded format data into recovered data at the external apparatus, wherein the transmitter transmits the encoded format data after the external apparatus completes assembling the executable processing information into the decoder, wherein both the executable processing information and the encoded format data are transmitted in response to receiving a request for only the data, wherein the executable processing information and the assembled decoder are automatically deleted from the receiver after completion of decoding the encoded streaming data.

12. An information-processing method for receiving data through a network, comprising:

requesting data;

receiving executable processing information;

storing the executable processing information in a memory;

assembling the executable processing information into a decoder in the memory to decode data that is in an encoded format;

after completion of assembling the executable processing information into a decoder, subsequently receiving the requested data in the encoded format;

decoding the received requested data in the encoded format into the requested data using the assembled decoder; and automatically deleting the stored executable processing information and the assembled decoder from the memory after completion of processing of the encoded data, wherein both the executable processing information and the encoded format data are received in response to sending a request for only the data.

13. An information-processing apparatus for transmitting streaming data through a network, comprising:

a receiving device configured to receive a request for streaming data;

an encoding device configured to encode the requested streaming data into an encoded format;

a transmission device configured to transmit said streaming data in the encoded format and executable processing information that can be assembled at an external apparatus into a decoder for the encoded format streaming data; and a control device configured to control said transmission means to transmit said executable processing information and then to transmit the streaming data in the encoded format after the external apparatus completes assembling the executable processing information into the decoder for the encoded format streaming data, wherein both the executable processing information and the encoded format streaming data are transmitted in response to receiving a request for only the streaming data, wherein the executable processing information and the assembled decoder are automatically deleted from the receiving device after completion of decoding the encoded streaming data.

14. An information-processing apparatus according to claim 13, wherein said executable processing information includes a decoder for decoding said streaming data.

15. An information-processing apparatus according to claim 13, wherein said executable processing information includes an encoder for encoding said streaming data.

16. An information-processing apparatus according to claim 13, wherein said executable processing information includes a transcoder for transcoding said streaming data.

17. An information-processing apparatus according to claim 13, wherein said executable processing information includes a scrambler for scrambling said streaming data.

18. An information-processing apparatus according to claim 13, wherein said executable processing information includes a descrambler for descrambling said streaming data.

19. An information-processing apparatus for receiving streaming data through a network, comprising:
a receiving device configured to receive streaming data in an encoded format and executable processing information;
an assembler device configured to assemble said executable processing information into a decoder for the encoded format streaming data;
a controller configured to control said assembler device to assemble said executable processing information and to control the receiving device to receive the encoded format streaming data after the assembler device completes assembling the executable processing information into the decoder for the encoded format streaming data;
a processing device configured to decode the encoded streaming data with the assembled decoder,
wherein both the executable processing information and the encoded format streaming data are received in response to sending a request for only the streaming data,
wherein the executable processing information and the assembled decoder are automatically deleted from the information-processing apparatus after completion of decoding the encoded streaming data.

20. The information-processing apparatus of claim 19, wherein said executable processing information includes a transcoder for transcoding said encoded format streaming data.

21. The information-processing apparatus of claim 19, wherein said executable processing information includes a descrambler for descrambling said encoded format streaming data.

22. A network system comprising a first information-processing apparatus connected to a network and used for transmitting encoded format streaming data and a second information-processing apparatus connected to said network and used for receiving said encoded format streaming data, wherein said first information-processing apparatus includes:
a receiving device configured to receive a request for streaming data from the second information-processing apparatus;
an encoding device configured to encode the requested streaming data into the encoded format;
a transmitter device configured to transmit said encoded format streaming data and executable processing information that can be assembled at the second information-processing apparatus into a decoder for the encoded format streaming data; and
a first controller device configured to control the transmitter device to transmit said executable processing information and then to transmit said encoded format streaming data after the second information-processing apparatus completes assembling the executable processing information into the decoder for the encoded format streaming data,
wherein said second information-processing apparatus includes:
a receiver device configured to receive the encoded format streaming data and executable processing information from the first information-processing means;
an assembler device configured to assemble said executable processing information into a decoder for the encoded format streaming data;
a second controller device configured to control said assemble means to assemble said executable processing information and to control the receiver device to receive the encoded format streaming data after the assembler device completes assembling the executable processing information into the decoder for the encoded streaming data
a processing device configured to decode the encoded format streaming data with the assembled decoder; and
an output device configured to output a result of said decoding carried out on said encoded format streaming data by said processing device,
wherein both the executable processing information and the encoded format streaming data are transmitted by the first information-processing apparatus in response to receiving a request for only the streaming data sent by the second information-processing apparatus,
wherein the executable processing information and the assembled decoder are automatically deleted from the second information-processing apparatus after completion of decoding the encoded streaming data.

* * * * *